(12) United States Patent
Steele et al.

(10) Patent No.: US 10,251,060 B2
(45) Date of Patent: Apr. 2, 2019

(54) MODIFYING ACCESS TO A SERVICE BASED ON CONFIGURATION DATA

(71) Applicant: INTEL CORPORATION, Santa Clara, CA (US)

(72) Inventors: Kelly Steele, Vancouver, WA (US); Rajesh Poornachandran, Portland, OR (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 15/277,047

(22) Filed: Sep. 27, 2016

(65) Prior Publication Data

US 2018/0091519 A1    Mar. 29, 2018

(51) Int. Cl.
   *H04W 12/08* (2009.01)
   *G06F 1/3206* (2019.01)
   *H04L 9/32* (2006.01)

(52) U.S. Cl.
   CPC ........... *H04W 12/08* (2013.01); *G06F 1/3206* (2013.01); *H04L 9/3234* (2013.01)

(58) Field of Classification Search
   CPC .............................. G06F 1/3206; H04L 9/3234
   See application file for complete search history.

(56) References Cited

U.S. PATENT DOCUMENTS

| | | | |
|---|---|---|---|
| 5,687,379 A | 11/1997 | Smith et al. | |
| 7,234,061 B1 * | 6/2007 | Diab | H04L 9/3236 380/2 |
| 7,552,475 B2 * | 6/2009 | Piwonka | G06F 21/85 726/22 |
| 7,845,016 B2 * | 11/2010 | Diab | H04L 9/3236 713/176 |
| 8,332,669 B2 * | 12/2012 | Darmawan | G06F 1/266 330/127 |
| 8,938,774 B2 * | 1/2015 | Dandekar | G06F 21/57 726/1 |
| 9,148,286 B2 * | 9/2015 | Li | G06F 21/31 |
| 9,426,147 B2 | 8/2016 | Smith et al. | |
| 9,817,951 B2 * | 11/2017 | Limaye | G06F 21/10 |

(Continued)

OTHER PUBLICATIONS

Premises-Aware Security MitigatesHealthcare Data Breaches; White Paper; Intel; 2014 (Year: 2014).*

(Continued)

*Primary Examiner* — James R Turchen
(74) *Attorney, Agent, or Firm* — International IP Law Group, P.L.L.C.

(57) ABSTRACT

In one example, a system for accessing services comprises a processor to detect a change in a topology of the system and request configuration data or a firmware image stored in secure storage of a wireless credential exchange or EEPROM, wherein the configuration data indicates an authorized stackable topology map for the system. The processor can also determine the change in the topology is allowed based on the authorized stackable topology map and execute an internet or local based service comprising a modification based on the change to the topology of the system, the service with the modification to be executed in response to a transmission of the change to the service.

22 Claims, 6 Drawing Sheets

(56) References Cited

U.S. PATENT DOCUMENTS

| | | | |
|---|---|---|---|
| 2002/0046342 A1* | 4/2002 | Elteto | G06F 21/32 713/185 |
| 2003/0009684 A1* | 1/2003 | Schwenck | H01L 23/573 713/194 |
| 2006/0156415 A1* | 7/2006 | Rubinstein | G06F 21/445 726/27 |
| 2008/0005415 A1* | 1/2008 | Lopez | G06F 13/385 710/62 |
| 2008/0022360 A1* | 1/2008 | Bacastow | G06F 21/85 726/1 |
| 2008/0052437 A1 | 2/2008 | Loffink et al. | |
| 2008/0191872 A1* | 8/2008 | Cardona | G08B 13/1418 340/568.1 |
| 2008/0270780 A1* | 10/2008 | Lopez | G06F 13/385 713/1 |
| 2009/0144476 A1 | 6/2009 | Cai et al. | |
| 2010/0153737 A1* | 6/2010 | Jayet | G06F 21/34 713/186 |
| 2013/0067534 A1* | 3/2013 | Soffer | G06F 3/0227 726/2 |
| 2013/0269043 A1* | 10/2013 | Limaye | G06F 21/10 726/34 |
| 2014/0162692 A1 | 6/2014 | Li et al. | |
| 2015/0006937 A1* | 1/2015 | Rotem | G06F 1/206 713/324 |
| 2015/0045936 A1* | 2/2015 | Alley | H01L 21/02 700/121 |
| 2015/0365237 A1* | 12/2015 | Soffer | G06F 21/85 726/20 |
| 2015/0370294 A1* | 12/2015 | Busch | G06F 1/206 713/322 |
| 2015/0381610 A1* | 12/2015 | Poornachandran | H04L 63/0853 713/155 |
| 2015/0381658 A1* | 12/2015 | Poornachandran | H04L 63/20 726/1 |
| 2016/0085995 A1* | 3/2016 | Poornachandran | G06F 21/73 726/34 |
| 2016/0173465 A1* | 6/2016 | Poornachandran | H04L 63/107 726/1 |
| 2017/0228339 A1* | 8/2017 | Shao | G06F 1/185 |

OTHER PUBLICATIONS

Wikipedia, "Trusted Execution Environment"; Retrieved Aug. 23, 2016, Last Modified Jun. 27, 2016, retrieved from: https://en.wikipedia.org/wiki/Trusted_execution_environment; 4 pages.

Gough, Chris, et al. "Premises-Aware Security Mitigates Healthcare Data Breaches"; Intel Corporation White Paper; Copyrighted Jul. 2014, 6 pages.

3CT International Search Report, PCT Application No. PCT/US2017/047281, dated Nov. 14, 2017, 3 pages.

* cited by examiner

200

300

MODIFYING ACCESS TO A SERVICE BASED ON CONFIGURATION DATA

TECHNICAL FIELD

This disclosure relates generally to configuration data corresponding to modified components of a computing device, but not exclusively, to modifying access to a service based on the configuration data.

BACKGROUND

Computing devices can include any number of components such as graphics processing units, storage devices, cameras, sensors, sensor hubs, and the like. In some examples, components can be included in stackable carrier boards. For example, a computing device may include any suitable number of carrier boards that are electronically coupled in a stackable topology. Accordingly, the components of a computing device can be modified by removing or adding a carrier board from the stack of electronically coupled carrier boards. In some embodiments, the removal of components can include removing any suitable hot pluggable device such as a storage device, a digital camera, or a sensor, among others.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
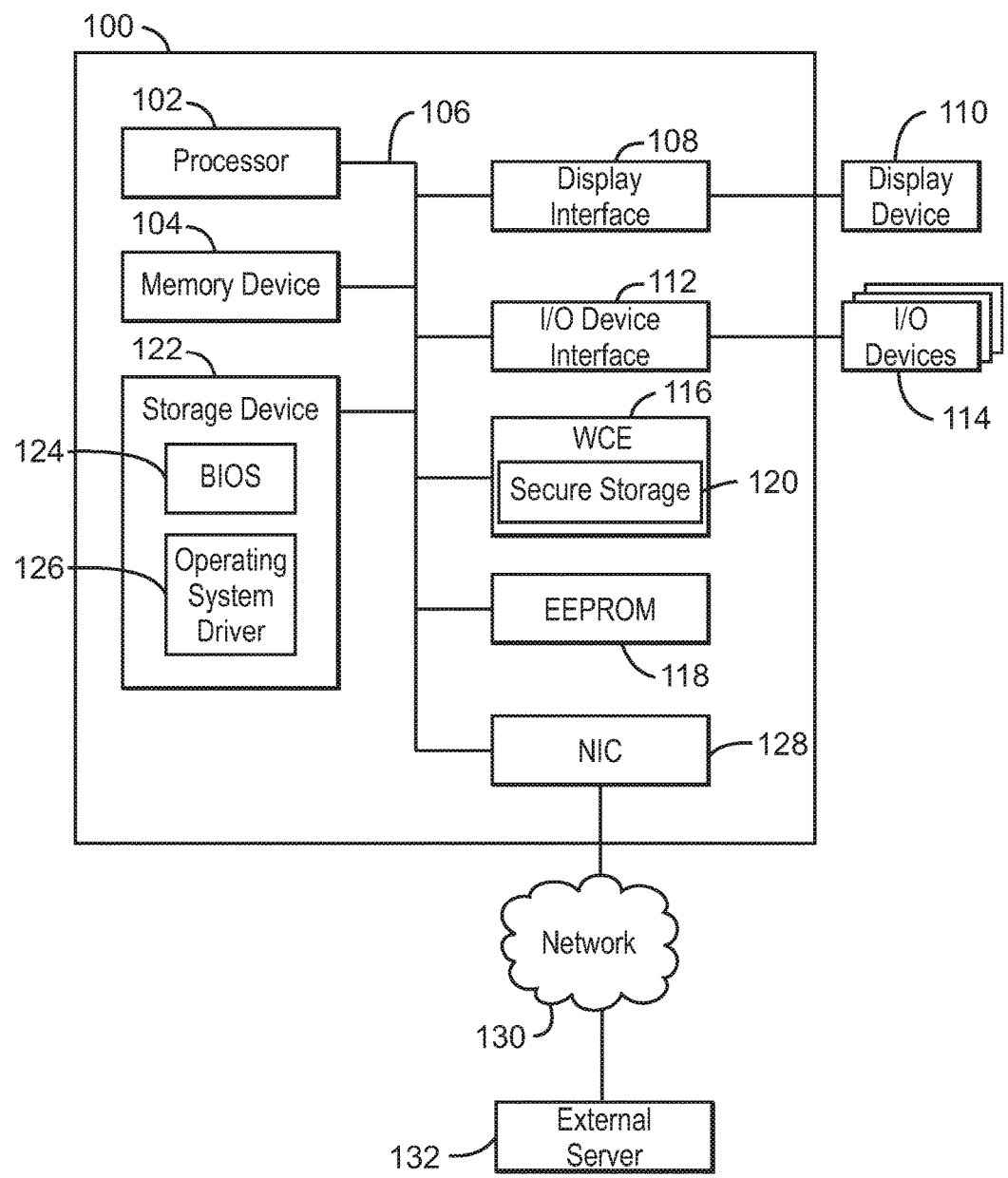
FIG. 1 illustrates a block diagram of a computing device that can access services based on configuration data.

As discussed above, a computing device can include any number of components such as graphics processing units, storage devices, cameras, sensors, sensor hubs, and the like. In some examples, the components can be included in stackable carrier boards. Furthermore, some applications and services executed by a computing device can involve receiving data from any number of components or transmitting data to any number of approved or allowed components in the stackable carrier boards. For example, software as a service executed on a computing device may include receiving data from an approved sensor hub or any number of approved sensors. However, some computing devices may be modified to include carrier boards with unapproved components. For example, carrier boards that can result in increasing an operating temperature of a processor above a threshold value, or collecting sensor data from unapproved sensors, among others, may be unauthorized for a system.

The techniques described herein include accessing services with a computing device that has a changed topology. A topology of a system, as referred to herein, can include any number of components within any number of carrier boards that are authorized to access a service or an application. For example, a topology of a system can indicate a number of carrier boards that are electronically coupled or stacked and the components included on each carrier board. In some embodiments, the system can request configuration data stored in secure storage of a wireless credential exchange. A wireless credential exchange, as referred to herein, can include any suitable component that can wirelessly detect and authenticate, via a radio frequency, configuration data to be locally stored in secure storage. The configuration data, as referred to herein, can indicate an authorized stackable topology map for the system, among other information. The authorized stackable topology map can indicate a maximum number of carrier boards that can be electronically coupled, a maximum operating temperature for a processing unit, a maximum number of storage devices in a system, authorized sensors, and the like. In some embodiments, the configuration data can be stored in the secure storage of the wireless credential exchange. Therefore, configuration data indicating an authorized stackable topology map can be stored in the secure storage as the system is manufactured. In some examples, the configuration data can be modified at a later date at authorized locations.

In some embodiments, the system can determine a change in the topology is allowed based on the authorized stackable topology map and execute a modification of an internet based service, or a local service, among others, in response to a transmission of the change to the service, wherein the modification is based on the change to the topology of the system. For example, the system can determine that a new carrier board added to the system includes a sensor that is authorized in the configuration data. Accordingly, the system can request a modification to a service based on the modified topology of the system. For example, a service can provide additional features based on sensor data captured from a new sensor, improved graphics or display information based on a new graphics processing unit, and the like.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

FIG. 1 is a block diagram of an example of a computing device that can access services based on configuration data. The computing device 100 may be, for example, a mobile phone, laptop computer, desktop computer, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can access services based on configuration data.

The processor 102 may also be linked through the system interconnect 106 (e.g., PCI®, PCI-Express®, NuBus, etc.) to a display interface 108 adapted to connect the computing device 100 to a display device 110. The display device 110 may include a display screen that is a built-in component of the computing device 100. The display device 110 may also include a computer monitor, television, or projector, among others, that is externally connected to the host computing device 100. The display device 110 can include light emitting diodes (LEDs), and micro-LEDs, among others.

The processor 102 may be connected through a system interconnect 106 to an input/output (I/O) device interface 112 adapted to connect the computing device 100 to one or more I/O devices 114. The I/O devices 114 may include, for example, a keyboard and a pointing device, wherein the pointing device may include a touchpad or a touchscreen, among others. The I/O devices 114 may be built-in components of the computing device 100, or may be devices that are externally connected to the computing device 100.

In some embodiments, the processor 102 may also be linked through the system interconnect 106 to a wireless credential exchange (WCE) 116 and an electrically erasable programmable read-only memory (EEPROM) 118. In some embodiments, the wireless credential exchange 116 can include configuration data stored in secure storage 120. The configuration data can indicate authorized components, carrier boards, and operating conditions for a system, among others. The EEPROM 118 can store any suitable firmware for components of the computing device 100.

In some embodiments, the processor 102 may also be linked through the system interconnect 106 to a storage device 122 that can include a hard drive, an optical drive, a USB flash drive, an array of drives, or any combinations thereof. In some embodiments, the storage device 122 can include any suitable applications. In some embodiments, the storage device 122 can include BIOS 124, such as a unified extensible firmware interface basic input/output system (UEFI BIOS), and an operating system driver 126. In some embodiments, the BIOS 124 can detect a change in a topology of the system. For example, the BIOS 124 can detect a new carrier board or component electrically coupled to the computing device 100. The BIOS 124 can also request configuration data stored in secure storage of a wireless credential exchange, wherein the configuration data indicates an authorized stackable topology map for the system. For example, the BIOS 124 can access an authorized stackable topology map stored in configuration data of the WCE 116 to determine if the new or modified component is authorized. If the new component or modified component is not authorized, the BIOS 124 can disable a port connected to the unauthorized new component or modified component. However, if the new component or modified component is authorized based on the configuration data, the BIOS 124 can enable an operating system driver 126 to access data from the new or modified component. In some embodiments, the operating system driver 126 can execute a service with a modification in response to a transmission of the change to the service. For example, the operating system driver 126 can receive a higher quality video from an internet based service in response to a new carrier card being coupled to the computing device 100 with an improved graphics processing unit. The operating system driver 126 can also enable modified services based on additional storage devices being coupled to the computing device 100, additional sensors collecting sensor data for the computing device 100, and the like.

In addition, a network interface controller (also referred to herein as a NIC) 128 may be adapted to connect the computing device 100 through the system interconnect 106 to a network 130. The network 130 may be a cellular network, a radio network, a wide area network (WAN), a local area network (LAN), or the Internet, among others. The network 130 can enable data to be transmitted between the computing device 100 and an external server 132. In some embodiments, the external server 132 can provide an internet based service to the computing device 100. For example, the external server 132 can detect a request for an internet based service and any modification to the topology of the computing device 100. The external server 132 can also transmit the internet based service or a modification to the internet based service in response to the change in topology of the computing device 100. In some embodiments, the external server 132 can enable or disable locally executed services on the computing device 100 based on changes in topology, location, and the like.

It is to be understood that the block diagram of FIG. 1 is not intended to indicate that the host computing device 100 is to include all of the components shown in FIG. 1. Rather, the host computing device 100 can include fewer or additional components not illustrated in FIG. 1 (e.g., additional memory components, embedded controllers, additional modules, additional network interfaces, etc.). Furthermore, any of the functionalities of the WCE 116, EEPROM 118, BIOS 124, and operating system driver 126 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the WCE 116, EEPROM 118, BIOS 124, and operating system driver 126 can be implemented with logic, wherein the logic, as referred to herein, can include any suitable hardware (e.g., a processor, among others), software (e.g., an application, among others), firmware, or any suitable combination of hardware, software, and firmware.

Figure 2:
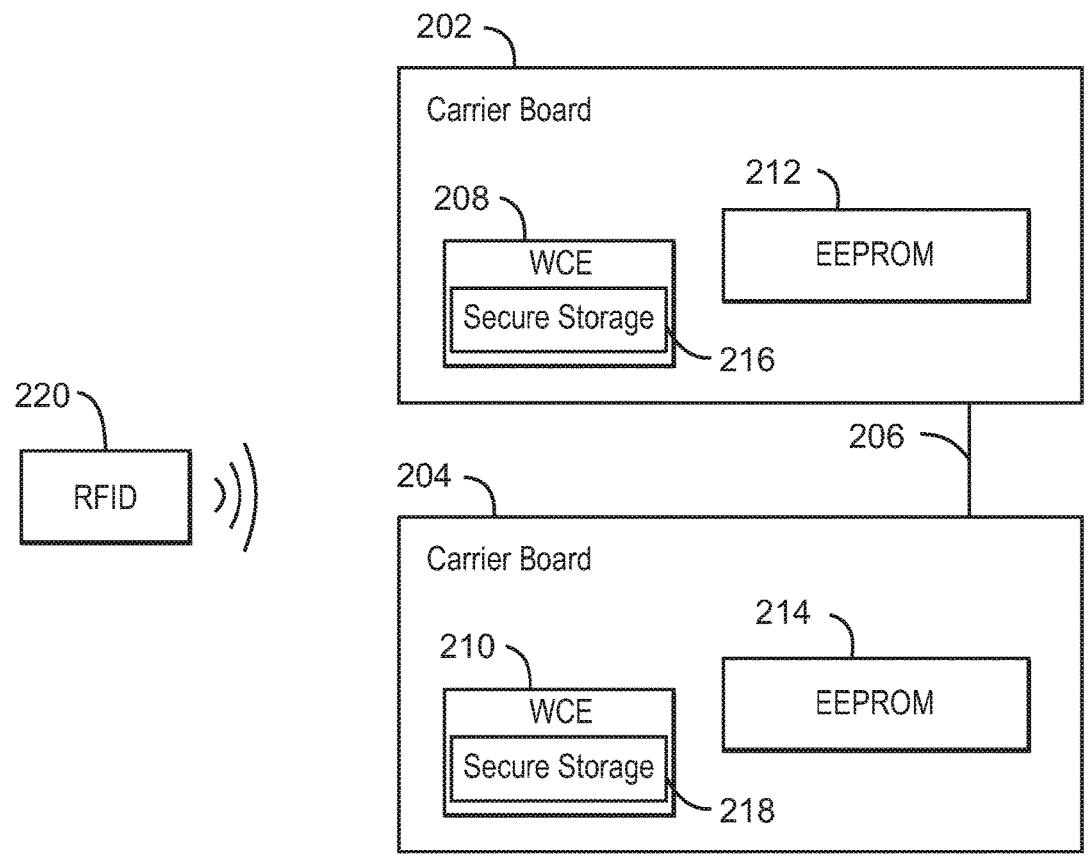
FIG. 2 illustrates a block diagram of stackable carrier boards that implement the embodiments described herein.

FIG. 2 depicts a block diagram of carrier boards that implement embodiments described herein. In some embodiments each carrier board 202 and 204 can be stackable and connected to additional circuit boards using any suitable connector 206, which may be flexible or rigid. In some embodiments, any number of carrier boards can be stacked and connected to one another. Each carrier board 202 and 204 can include any suitable number of components. For example, a carrier board 202 and 204 may include a graphics processing unit, a camera, a storage device, a central processing unit, a hot-pluggable component, and the like. In some examples, each carrier board 202 and 204 can include a wireless credential exchange 208, 210 and an EEPROM 212, 214. As discussed above, a wireless credential exchange 208, 210 for each carrier board 202 and 204 can store configuration data indicating reserved configuration, blacklist configurations, and whitelist configurations, which are described in greater detail below in relation to FIG. 3. The WCE 208, 210 can include secure storage 216, 218 to store the configuration data. In some embodiments, each EEPROM 212, 214 can store firmware and any other suitable information for components on a carrier board 202 and 204.

In some embodiments, each wireless credential exchange 208, 210 can interact with a radio frequency identifier 220 in close proximity to the carrier boards 202, 204. For example, each wireless credential exchange 208, 210 can detect provisioning data, such as static information, which can be stored in the WCE 208, 210 and the EEPROM 212, 214. Static information, as referred to herein, can indicate characteristics of the components of the carrier boards such as maximum capabilities of each component, and the like. In some examples, the WCE 208, 210 and EEPROM 212, 214 receive provisioning data in a manufacturing facility before the WCE 208, 210 and EEPROM 212, 214 are shipped to users. In some examples, as discussed below, the provisioning data stored in the WCE 208, 210 and EEPROM 212, 214 can be modified at any suitable time based on geo-fencing data. For example, the geo-fencing data can indicate that a carrier board 202, 204 is in a predetermined secure location that enables the provisioning data stored in the WCE 208, 210 and EEPROM 212, 214 to be modified. In some examples, the provisioning data can be modified to enable diagnostic tools to be executed by a carrier board 202 and 204.

It is to be understood that the block diagram of FIG. 2 is not intended to indicate that the carrier boards 202 and 204 are to include all of the components shown in FIG. 2. Rather, the carrier boards 202 and 204 can include fewer or additional components not illustrated in FIG. 2 (e.g., additional memory components, embedded controllers, additional sensors, additional interfaces, etc.).

Figure 3:
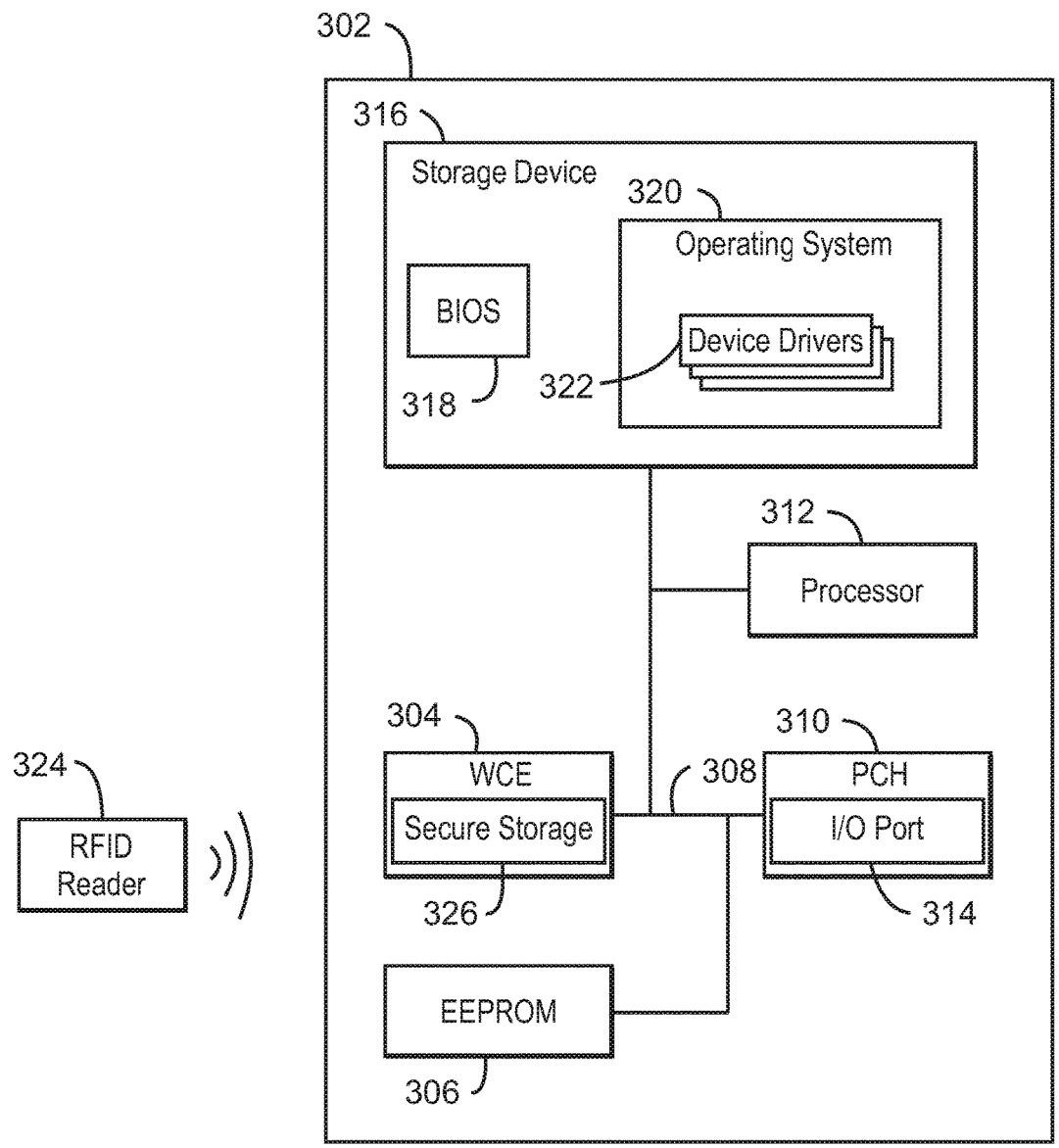
FIG. 3 is an example system that can access an internet based service or local service with support from an external network based entity.

FIG. 3 is an example system that can access an internet based service or local service with support from an external network based entity. In some embodiments, the system 300 can include hardware such as a carrier board 302 that includes a wireless credential exchange (WCE) 304, EEPROM 306, a transmission link 308, a platform control hub (PCH) 310, and a processor 312. In some embodiments, the platform control hub 310 can control data paths between peripheral devices and the processor 312. In some embodiments, the transmission link 308 can be a multi-master, multi-slave, single ended, serial computer bus such as I2C, or any other suitable transmission link. In some embodiments, the carrier card 302 is enabled to trigger a system management mode in response to a peripheral device being detected or removed from an input/output (I/O) port 314 of the peripheral control hub (PCH) 310. In some examples, the PCH 310 can include any suitable number of I/O ports.

In some embodiments, the carrier board 302 can also include software in a storage device 316. For example, the storage device 316 can store BIOS 318 that includes a board manager (not depicted) and transmission link driver (not depicted), and an operating system 320 that includes any number of device drivers 322.

In some embodiments, a radio frequency identification (RFID) reader 324 can transmit configuration data to the WCE 304. The WCE 304 can store the configuration data in secure storage 326. In some embodiments, the configuration data can include reserved configurations, blacklist configurations, and whitelist configurations, among others. A whitelist configuration, as referred to herein, can include an authorized stackable topology map that indicates a number of carrier boards that can be included in a system, types of carrier boards that can be included in a system, a temperature range or maximum temperature of the processor 312, a clock speed of a processor 312, a number of peripheral devices that can be connected to the PCH 310, and the like. In some examples, the blacklist configurations can include stackable topology maps that are unauthorized. For example, the blacklist configurations can indicate ports of the PCH 310 that are to be disabled, clock speeds of the processor 312 that are not supported, and the like. In some embodiments, reserved configurations, as referred to herein, correspond to stackable topology maps authorized for particular vendors or users. For example, reserved configurations can indicate combinations of carrier boards and peripheral components that are authorized for particular vendors or users.

In some embodiments, the BIOS 318 can detect a change to a system when a peripheral component has been plugged into the PCH 310 or unplugged from the PCH 310. In some examples, the BIOS 318 can detect the change in response to an interrupt generated by the PCH 310. The BIOS 318 can request configuration data, such as whitelist configurations, blacklist configurations, and reserved configurations, from the secure storage 326 of the WCE 304. If the change to the system 300 is unauthorized based on the configuration data, the BIOS 318 can disable an I/O port 314 of the PCH 310 corresponding to a new peripheral component, generate an alarm, and the like. If the change to the system 300 is authorized based on the configuration data, the BIOS 318 can indicate to device drivers 322 that the carrier board 302 has a new component or a component has been removed. The device drivers 322 can request a modification to a service from an external server based on the change to the system. The modification to the service is described in greater detail below in relation to FIG. 4.

It is to be understood that the block diagram of FIG. 3 is not intended to indicate that the carrier board 302 is to include all of the components shown in FIG. 3. Rather, the carrier board 302 can include fewer or additional components not illustrated in FIG. 3 (e.g., additional memory components, embedded controllers, additional sensors, additional interfaces, etc.). For example, the storage device 316, processor 312, PCH 310, WCE 304, and EEPROM 306 can be electronically connected via the transmission link 308. Additionally, the carrier board 302 can include any suitable network card for interfacing with the external server.

Figure 4:
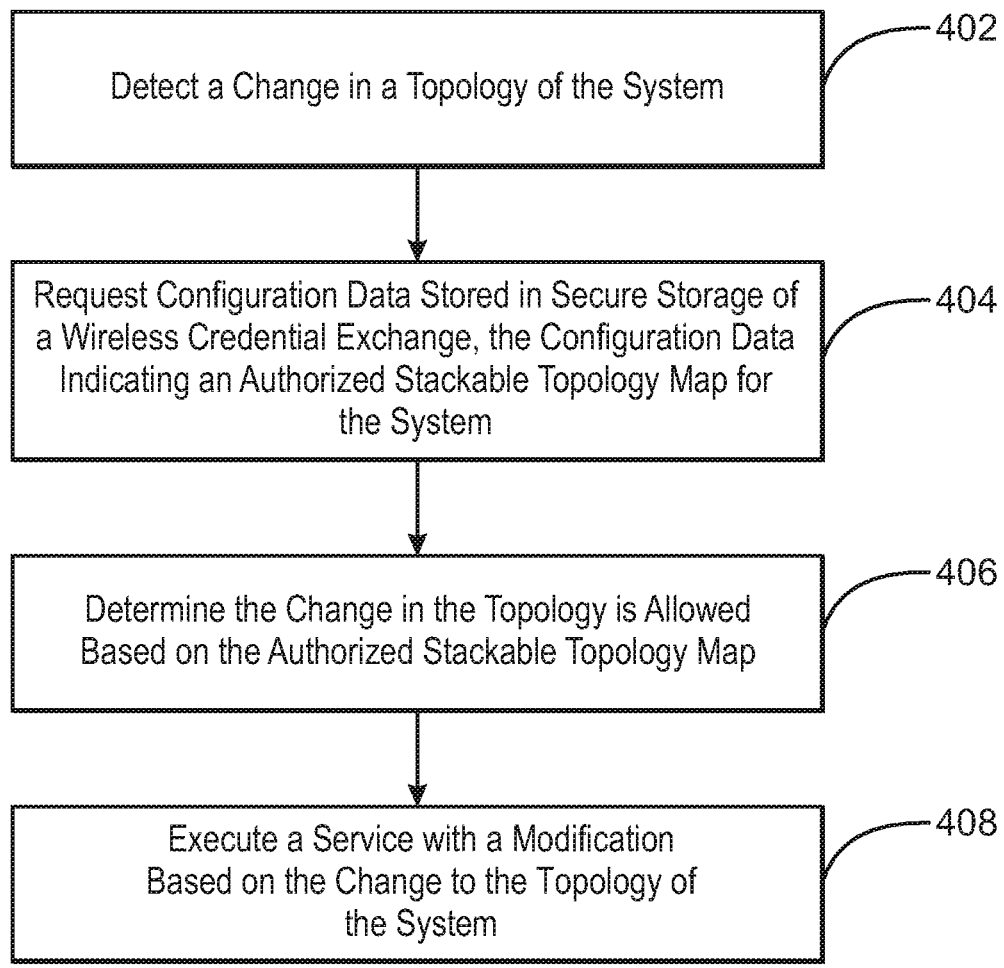
FIG. 4 is an example process flow diagram for accessing an internet based service.

FIG. 4 is an example process flow diagram for accessing an internet based or local service. The method 400 can be implemented with any suitable computing device such as computing device 100 of FIG. 1 or system 300 of FIG. 3, among others.

At block 402, BIOS can detect a change in a topology of the system. For example, the BIOS can detect a new peripheral component such as a storage device, sensor, sensor hub, graphics processing board, and the like. In some embodiments, the change in the topology of the system can also include modifying the number of carrier cards included in a system. For example, carrier cards can be added to a system or removed from a system. In some embodiments, the change in the topology of the system comprises detecting a hot-pluggable component, which enables an operating system to load a driver to support the hot-pluggable component in response to determining that the change in the topology of the system is allowed based on the configuration data. In some embodiments, the change in the topology of the system includes disabling, via software, a component of the system, wherein the component can be a graphics card, a storage device, a camera, or a sensor, among others. In some embodiments, the BIOS can detect the change in topology of a system by performing peripheral discovery such as polling for new peripheral devices. The BIOS can also poll a sensor hub to identify a dynamic finger print of a system that includes a battery, power management integrated circuit, and the like.

At block 404, BIOS can request configuration data stored in secure storage of a wireless credential exchange, the configuration data indicating an authorized stackable topology map for the system. For example, the authorized stackable topology map can indicate static information or dynamic information. In some embodiments, the static information can include geo-fencing data, a maximum clock speed of a processor, vendor credentials for components, and the like. The geo-fencing data, as referred to herein, can indicate geographic locations in which the configuration data can be provisioned or modified. The provisioning of configuration data is explained in greater detail below in relation to FIG. 5. In some embodiments, the dynamic information can include current input/output configurations, active power drain information from a battery sensor or power management integrated circuit, and various threshold values for thermal design power values, among others.

At block 406, BIOS can determine the change in the topology is allowed based on the authorized stackable topology map. As discussed above, the configuration data can include whitelist configurations, blacklist configurations, and reserved configurations that indicate authorized and unauthorized stackable topology maps. For example, the stackable topology maps can indicate if the change to the topology of the system is unauthorized by exceeding a maximum number of carrier cards in a system, exceeding a maximum number of storage devices in a system, if the change results in an operating temperature range of a processor being exceeded, and the like. In some embodiments, the configuration data can include a set of whitelist configuration data indicating a maximum clock speed or temperature of the processor. In some examples, the configuration data can include a set of blacklist configuration data indicating the processor is operating above a maximum clock speed or temperature.

At block 408, an operating system driver can execute a service with a modification based on the change to the topology of the system in response to a transmission of the change to the service. In some embodiments, the modification to the service can include disabling a camera in response to detecting geo-fencing information. The modification can also include providing a service that consumes less power to prevent a high power mode in a wearable device from burning a user. Additionally, the modification can include streaming video at different bandwidths based on a change in number of graphics processing units or a change in capabilities of a graphics processing unit. In some embodiments, the modification can also include changing a frequency that a service polls sensors or a sensor hub to lower power consumption or prevent a high power mode. In some embodiments, the modification to the service can also include requesting sensor data from a different combination of sensors based on current power states of a system and threshold power levels indicated by configuration data.

In some examples, a remote server can generate policy decisions indicating what level or type of services are to be enabled or disabled. For example, a remote server can determine if a camera component is to be enabled or disabled in a computing device. In some embodiments, based on a policy decision from a remote server, local BIOS or an operating system can enforce policies and transmit an acknowledge to a remote server. In some examples, a remote server can enable BIOS can determine if policies are to be enabled or disabled independently. Accordingly, BIOS can determine if components are to be enabled or disabled based on a locally stored policy.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the BIOS can determine that a hot-pluggable component is not allowed based on the configuration data and disable a port connected to the hot-pluggable component. The BIOS can also load a stackable topology map from secure storage when initializing a system. If an EEPROM header integrity check matches cached contents in flash memory, the full EEPROM may not be read. In some embodiments, if BIOS detects a restricted profile, the BIOS can keep a port disabled, generate an alarm to an administrator for any unauthorized changes to the topology of the system, and store the alarm in a log.

Figure 5:
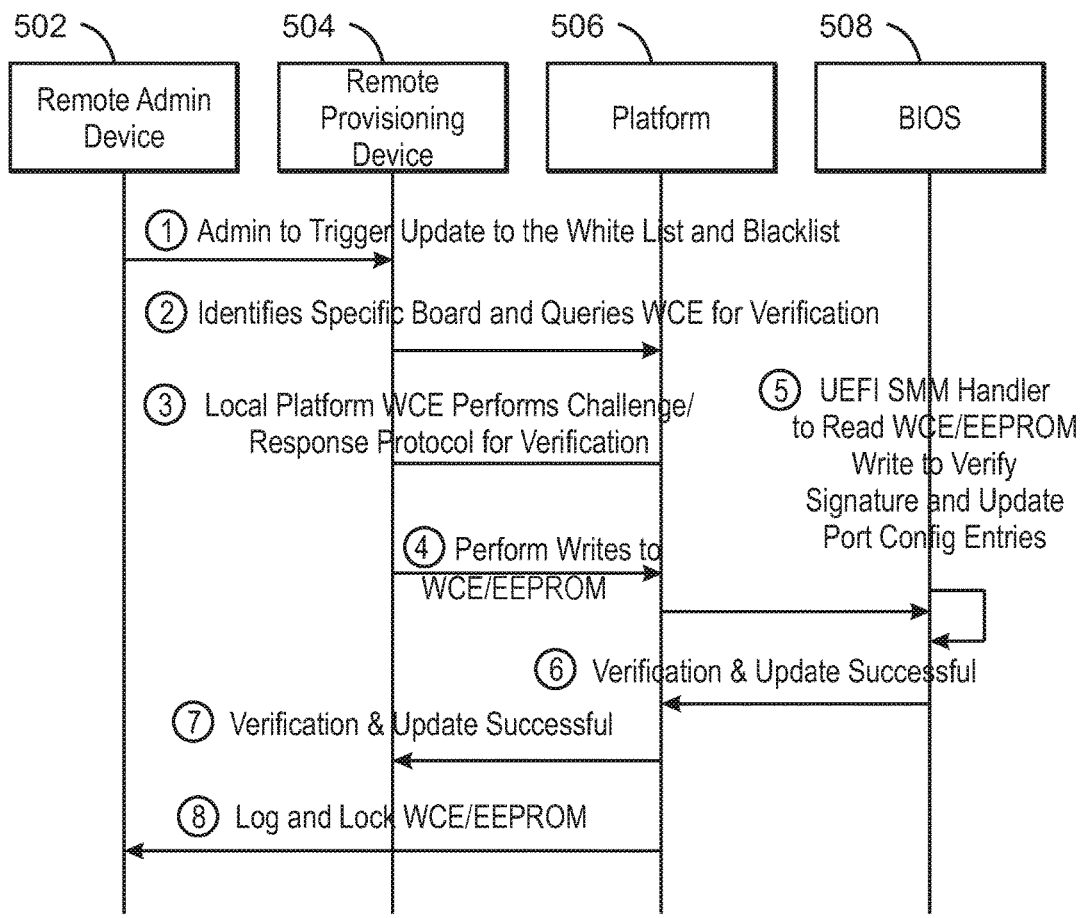
FIG. 5 is a timing diagram for modifying configuration data.

FIG. 5 is a timing diagram for modifying configuration data. The timing diagram 500 can be implemented on any suitable computing device such as the computing device 100 of FIG. 1 or the system 300 of FIG. 3, among others.

As indicated by the circled number one, a remote admin device 502 can trigger an update to configuration data such as whitelist configurations or blacklist configurations, stored in secure storage of a system. For example, a remote admin device can request that a remote provisioning device 504 update the configuration data. In some embodiments, the remote provisioning device 504 can include a radio frequency identification transmitter that indicates to BIOS in a system that configuration data is to be updated. In some embodiments, firmware stored in EEPROM can also be updated.

As indicated by the circled number two, the remote provisioning device 504 can identify the carrier board of a system (also referred to herein as a platform) 506 and query the secure storage of the WCE of the system for verification. As indicated by the circled number 3, the remote provisioning device 504 can perform a challenge and response protocol for verification. In some embodiments, the challenge and response protocol can be based on credential provisioned during manufacturing.

As indicated by the circled number four, the remote provisioning device 504 can read, write, or update the WCE of a system 506 being provisioned. For example, the remote provisioning device 504 can transmit static information or dynamic information to be stored in a wireless credential exchange (WCE) or an EEPROM of the system being provisioned. The static information can include a maximum operating temperature or maximum clock cycle of a processor, a maximum number of carrier boards that can be electronically coupled, and the like. The dynamic information can include an active power drain of a battery sensor and the like.

As indicated by the circled number five, BIOS 508 of the system 506 being provisioned can access secure storage of the WCE or the EEPROM to verify a digital signature and update configuration data such as port configurations. In other words, the BIOS 508 can detect provisioning data and enable the alteration of configuration data stored in the wireless credential exchange (WCE) or firmware stored in an electrically erasable programmable read-only memory (EEPROM). In some embodiments, the alteration can enable a diagnostic tool to be executed on the device 506 being provisioned.

As indicated by the circled number six, BIOS 508 of the system 506 being provisioned can send an indicator to the WCE indicating the update has been successful. As indicated by the circled number seven, the device 506 can send the indicator to the remote provisioning device 504 indicating that the update has been successful. As indicated by the circled number eight, the WCE of the device 506 can log the update to the configuration data or the firmware and lock the WCE and EEPROM from additional alterations. In some embodiments, the logging data can be stored within the WCE or EEPROM or remotely on a remote admin device 502.

In some embodiments, the remote provisioning device 504 can use a dynamic fingerprint to identify which stackable boards are to be provisioned. A dynamic fingerprint, as referred to herein can include a topology of a device that indicates various components and carrier boards to be provisioned. For example, the remote provisioning device 504 can derive associated policies to be enforced locally based on a dynamic fingerprint.

The timing diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
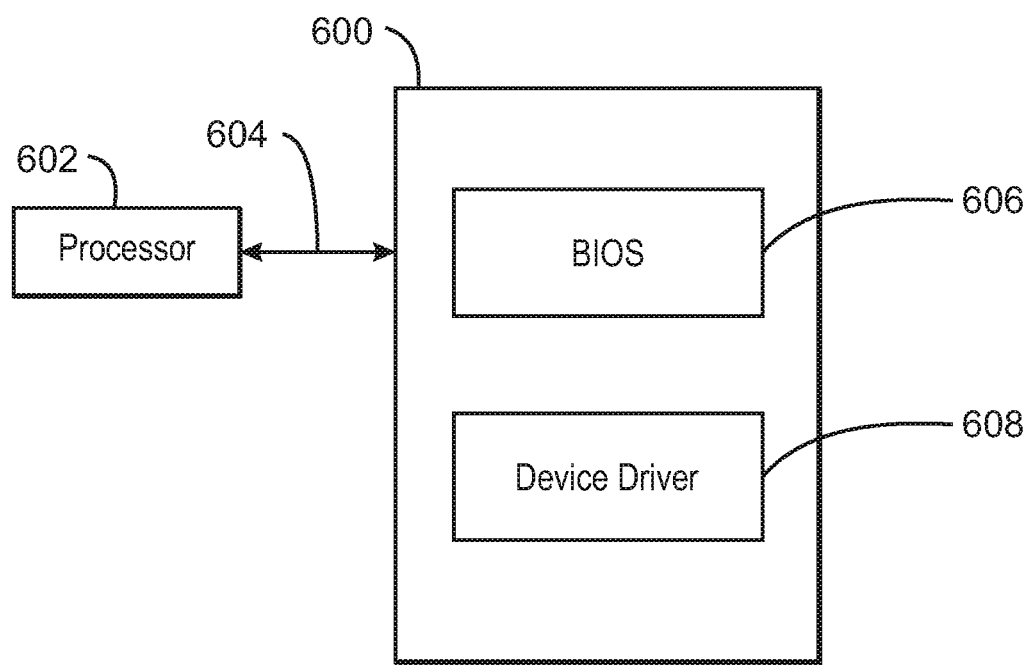
FIG. 6 illustrates a block diagram of a non-transitory computer readable media for accessing services according to configuration data.

FIG. 6 illustrates a block diagram of a non-transitory computer readable media for accessing services according to configuration data. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the current method.

The various software components discussed herein may be stored on the tangible, non-transitory, computer-readable medium 600, as indicated in FIG. 6. For example, a BIOS 606 may be adapted to direct the processor 602 to detect a change in a topology of a system and request configuration data stored in secure storage of a wireless credential exchange, wherein the configuration data indicates an authorized stackable topology map for the system. The BIOS 606 can also determine the change in the topology is allowed based on the authorized stackable topology map. In some embodiments, a device driver 608 can execute a modified service in response to a transmission of the change to the service.

It is to be understood that any suitable number of the software components shown in FIG. 6 may be included within the tangible, non-transitory computer-readable medium 600. Furthermore, any number of additional software components not shown in FIG. 6 may be included within the tangible, non-transitory, computer-readable medium 600, depending on the specific application.

EXAMPLE 1

In some examples, a system for accessing a service comprises a processor that can detect a change in a topology of the system and request configuration data stored in secure storage of a wireless credential exchange, wherein the configuration data indicates an authorized stackable topology map for the system. The processor can also determine the change in the topology is allowed based on the authorized stackable topology map and execute a service comprising a modification based on the change to the topology of the system. In some examples, the service with the modification can be executed in response to a transmission of the change to the service.

Alternatively, or in addition, the change in the topology of the system can include electronically coupling a hot-pluggable component to the system, wherein the processor can enable an operating system to load a driver to support the hot-pluggable component in response to determining that the change in the topology of the system is allowed based on the configuration data. Alternatively, or in addition, the processor can determine that a hot-pluggable component is not allowed based on the configuration data and disable a port connected to the hot-pluggable component. Alternatively, or in addition, the processor can disable, via software, a component of the system. Alternatively, or in addition, the processor can store static information in the wireless credential exchange (WCE) or an electrically erasable programmable read-only memory (EEPROM). Alternatively, or in addition, the processor can detect provisioning data and enable the alteration of configuration data stored in the wireless credential exchange (WCE) or firmware stored in an electrically erasable programmable read-only memory (EEPROM). Alternatively, or in addition, the alteration can include enabling a diagnostic tool to be executed on the system. Alternatively, or in addition, the processor can store logging data corresponding to the alteration locally in secure storage or on a remote device. Alternatively, or in addition, the hot-pluggable component can be a camera, a stackable board with a sensor, or any combination thereof. Alternatively, or in addition, the configuration data can include a set of whitelist configuration data indicating a maximum clock speed or a maximum temperature of the processor. Alternatively, or in addition, the configuration data can include a set of blacklist configuration data indicating the processor is operating above a maximum clock speed or a maximum temperature. Alternatively, or in addition, the modification can include disabling the camera in response to detecting geo-fencing information stored locally and accessible by a basic input/output system (BIOS).

EXAMPLE 2

In some examples, a method for accessing a service includes detecting a change in a topology of the system and requesting configuration data stored in secure storage of a wireless credential exchange, wherein the configuration data indicates an authorized stackable topology map for the system. The method can also include determining the change in the topology is allowed based on the authorized stackable topology map and executing a service comprising a modification based on the change to the topology of the system, wherein the service with the modification is executed in response to a transmission of the change to the service.

Alternatively, or in addition, the change in the topology of the system can include electronically coupling a hot-pluggable component to the system, and the method can include enabling an operating system to load a driver to support the hot-pluggable component in response to determining that the change in the topology of the system is allowed based on the configuration data. Alternatively, or in addition, the method can include determining that a hot-pluggable component is not allowed based on the configuration data and disabling a port connected to the hot-pluggable component. Alternatively, or in addition, the method can include disabling, via software, a component of the system. Alternatively, or in addition, the method can include storing static information in the wireless credential exchange (WCE) or an electrically erasable programmable read-only memory (EEPROM). Alternatively, or in addition, the method can include detecting provisioning data and enabling the alteration of configuration data stored in the wireless credential exchange (WCE) or firmware stored in an electrically erasable programmable read-only memory (EEPROM). Alternatively, or in addition, the alteration can include enabling a diagnostic tool to be executed on the system. Alternatively, or in addition, the method can include storing logging data corresponding to the alteration locally in secure storage or on a remote device. Alternatively, or in addition, the hot-pluggable component can be a camera, a stackable board with a sensor, or any combination thereof. Alternatively, or in addition, the configuration data can include a set of whitelist configuration data indicating a maximum clock speed or a maximum temperature of a processor. Alternatively, or in addition, the configuration data can include a set of blacklist configuration data indicating a processor is operating above a maximum clock speed or a maximum temperature. Alternatively, or in addition, the modification can include disabling the camera in response to detecting geo-fencing information stored locally and accessible by a basic input/output system (BIOS).

EXAMPLE 3

In some examples, a tangible, non-transitory computer readable media for accessing services comprises a plurality of instructions that in response to being executed by a processor, cause the processor to detect a change in a topology of the system. The plurality of instructions can also cause the processor to request configuration data stored in secure storage of a wireless credential exchange, the configuration data indicating an authorized stackable topology map for the system. Furthermore, the plurality of instructions can cause the processor to determine the change in the topology is allowed based on the authorized stackable topology map and execute an internet or local based service comprising a modification based on the change to the topology of the system, the internet or local based service with the modification to be executed in response to a transmission of the change to the internet or local based service.

Alternatively, or in addition, the change in the topology of the system can include electronically coupling a hot-pluggable component to the system, wherein the plurality of instructions cause the processor to enable an operating system to load a driver to support the hot-pluggable component in response to determining that the change in the topology of the system is allowed based on the configuration data. Alternatively, or in addition, the plurality of instructions can cause the processor to determine that a hot-pluggable component is not allowed based on the configuration data and disable a port connected to the hot-pluggable component. Alternatively, or in addition, the plurality of instructions can cause the processor to disable, via software, a component of the system. Alternatively, or in addition, the plurality of instructions can cause the processor to store static information in the wireless credential exchange (WCE) or an electrically erasable programmable read-only memory (EEPROM). Alternatively, or in addition, the plurality of instructions can cause the processor to detect provisioning data and enable the alteration of configuration data stored in the wireless credential exchange (WCE) or firmware stored in an electrically erasable programmable read-only memory (EEPROM). Alternatively, or in addition, the alteration can include enabling a diagnostic tool to be executed on the system. Alternatively, or in addition, the plurality of instructions can cause the processor to store logging data corresponding to the alteration locally in secure storage or on a remote device. Alternatively, or in addition, the hot-pluggable component can be a camera, a stackable board with a sensor, or any combination thereof. Alternatively, or in addition, the configuration data can include a set of whitelist configuration data indicating a maximum clock speed or a maximum temperature of the processor. Alternatively, or in addition, the configuration data can include a set of blacklist configuration data indicating the processor is operating above a maximum clock speed or a maximum temperature. Alternatively, or in addition, the modification can include disabling the camera in response to detecting geo-fencing information stored locally and accessible by a basic input/output system (BIOS).

Although an example embodiment of the disclosed subject matter is described with reference to block and flow diagrams in FIGS. 1-6, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for accessing services comprising:
a hardware processor to:
detect a change in a topology of the system, wherein the topology of the system indicates a number of carrier boards that are electronically coupled;
request configuration data stored in secure storage of a wireless credential exchange, the configuration data indicating an authorized stackable topology map for the system;
determine the change in the topology is allowed based on the authorized stackable topology map; and
execute a service comprising a modification based on the change to the topology of the system, the service with the modification to be executed in response to a transmission of the change to the service.

2. The system of claim 1, wherein the change in the topology of the system comprises electronically coupling a hot-pluggable component to the system, and wherein the hardware processor is to enable an operating system to load a driver to support the hot-pluggable component in response to determining that the change in the topology of the system is allowed based on the configuration data.

3. The system of claim 1, wherein the hardware processor is to determine that a hot-pluggable component is not allowed based on the configuration data and disable a port connected to the hot-pluggable component.

4. The system of claim 1, wherein the hardware processor is to disable, via software, a component of the system.

5. The system of claim 1, wherein the hardware processor is to store static information in the wireless credential exchange (WCE) or an electrically erasable programmable read-only memory (EEPROM).

6. The system of claim 1, wherein the hardware processor is to detect provisioning data and enable the alteration of configuration data stored in the wireless credential exchange (WCE) or firmware stored in an electrically erasable programmable read-only memory (EEPROM).

7. The system of claim 6, wherein the alteration comprises enabling a diagnostic tool to be executed on the system.

8. The system of claim 6, wherein the hardware processor is to store logging data corresponding to the alteration locally in secure storage or on a remote device.

9. The system of claim 3, wherein the hot-pluggable component is a camera, a stackable board with a sensor, or any combination thereof.

10. The system of claim 1, wherein the configuration data comprises a set of whitelist configuration data indicating a maximum clock speed or a maximum temperature of the hardware processor.

11. The system of claim 1, wherein the configuration data comprises a set of blacklist configuration data indicating the hardware processor is operating above a maximum clock speed or a maximum temperature.

12. The system of claim 9, wherein the modification comprises disabling the camera in response to detecting geo-fencing information stored locally and accessible by a basic input/output system (BIOS).

13. A method for accessing a service comprising:
detecting a change in a topology of the system, wherein the topology of the system indicates a number of carrier boards that are electronically coupled;
requesting configuration data stored in secure storage of a wireless credential exchange, the configuration data indicating an authorized stackable topology map for the system;
determining the change in the topology is allowed based on the authorized stackable topology map; and
executing a service comprising a modification based on the change to the topology of the system, wherein the service with the modification is executed in response to a transmission of the change to the service.

14. The method of claim 13, comprising determining that a hot-pluggable component is not allowed based on the configuration data and disabling a port connected to the hot-pluggable component.

15. The method of claim 13, wherein the change in the topology of the system comprises disabling, via software, a component of the system.

16. The method of claim 13, comprising storing static information in the wireless credential exchange (WCE) or an electrically erasable programmable read-only memory (EEPROM).

17. The method of claim 14, wherein the hot-pluggable component is a camera, a stackable configurable board with a sensor, or any combination thereof.

18. A tangible, non-transitory computer readable media for accessing services comprising a plurality of instructions that in response to being executed by a processor, cause the processor to:
detect a change in a topology of the system, wherein the topology of the system indicates a number of carrier boards that are electronically coupled;
request configuration data stored in secure storage of a wireless credential exchange, the configuration data indicating an authorized stackable topology map for the system;

determine the change in the topology is allowed based on the authorized stackable topology map; and execute an internet or local based service comprising a modification based on the change to the topology of the system, the internet or local based service with the modification to be executed in response to a transmission of the change to the internet or local based service.

19. The tangible, non-transitory computer-readable media of claim 18, wherein the plurality of instructions cause the processor to detect provisioning data and enable an alteration to the wireless credential exchange (WCE) or an electrically erasable programmable read-only memory (EEPROM).

20. The tangible, non-transitory computer-readable media of claim 19, wherein the alteration comprises enabling a diagnostic tool to be executed.

21. The tangible, non-transitory computer-readable media of claim 19, wherein the plurality of instructions cause the processor to store logging data corresponding to the alteration in secure storage of the wireless credential exchange (WCE) or on a remote device.

22. The tangible, non-transitory computer-readable media of claim 18, wherein the plurality of instructions cause the processor to detect a digital fingerprint from a remote server and store the digital fingerprint locally to enable a basic input/output system (BIOS) to execute the internet or local based service.

* * * * *